US012651864B2

(12) United States Patent
Sansur

(10) Patent No.: US 12,651,864 B2
(45) Date of Patent: Jun. 9, 2026

(54) MAGNETICALLY COUPLED CIRCUITS

(71) Applicant: Michael Sansur, Silverado, CA (US)

(72) Inventor: Michael Sansur, Silverado, CA (US)

(73) Assignee: Michael Sansur, Silverado, CA (US)

( * ) Notice: Subject to any disclaimer, the term of this patent is extended or adjusted under 35 U.S.C. 154(b) by 307 days.

(21) Appl. No.: 18/368,398

(22) Filed: Sep. 14, 2023

(65) Prior Publication Data

US 2024/0128682 A1 Apr. 18, 2024

Related U.S. Application Data

(60) Provisional application No. 63/415,899, filed on Oct. 13, 2022.

(51) Int. Cl.

| | |
|---|---|
| ***H01R 13/62*** | (2006.01) |
| ***H01R 12/72*** | (2011.01) |
| ***H01R 12/73*** | (2011.01) |
| ***H01R 13/631*** | (2006.01) |

(52) U.S. Cl.

CPC ....... *H01R 13/6205* (2013.01); *H01R 12/722* (2013.01); *H01R 12/732* (2013.01); *H01R 13/631* (2013.01)

(58) Field of Classification Search

CPC ............. H01R 13/6205; H01R 13/631; H01R 12/722; H01R 12/732

See application file for complete search history.

(56) References Cited

U.S. PATENT DOCUMENTS 3,998,004 A * 12/1976 Ehrlich ................ A63H 33/046 446/92
5,048,704 A * 9/1991 Takahashi ............. H01F 7/0263 213/75 D
6,851,831 B2 2/2005 Karlicek, Jr.
7,080,927 B2 7/2006 Feuerborn et al.
7,154,363 B2 * 12/2006 Hunts ................... H01F 7/0242 446/92
7,322,873 B2 1/2008 Rosen et al.
7,344,379 B2 3/2008 Marmaropoulos et al.
7,741,806 B2 6/2010 Kuhlmann et al.
8,058,957 B2 11/2011 Irion, II et al.
8,187,006 B2 5/2012 Rudisill et al.
8,491,312 B2 7/2013 Rudisill et al.
(Continued)

FOREIGN PATENT DOCUMENTS

GB 2442251 A 4/2008

*Primary Examiner* — Thanh Tam T Le
(74) *Attorney, Agent, or Firm* — Fish IP Law, LLP

(57) ABSTRACT

Rapid edge-coupling and decoupling of circuits is effected by current carrying magnets. The magnets are preferably neodymium iron boron for magnetic strength, although other suitable magnetic compositions are contemplated. As used herein, the term “magnet” includes both one or more magnetic materials, and any electrically conductive protective or other coating about the magnetic material(s). In preferred embodiments at least one of the magnets is slidable in at least a first degree of freedom. Movement of the magnet is constrained by a mechanical guide, which can optionally have curved sides. Electrical current can be carried to/from the magnet through an electrical path on or in a substrate, and in some embodiments through sides of the mechanical guide. In various embodiments, the electrical path might or might not extend to the edge of the substrate.

10 Claims, 4 Drawing Sheets

(56) References Cited

U.S. PATENT DOCUMENTS

| | | | | |
|---|---|---|---|---|
| 8,564,291 | B2 * | 10/2013 | Nelson | A61B 5/30<br>324/309 |
| 8,794,980 | B2 * | 8/2014 | McCormack | H01R 13/6205<br>439/39 |
| 8,991,040 | B2 * | 3/2015 | Chen | G01R 1/0408<br>434/118 |
| 9,019,718 | B2 * | 4/2015 | Bdeir | H01R 13/6205 |
| 9,118,990 | B2 * | 8/2015 | Hankey | H01R 29/00 |
| 9,325,107 | B2 * | 4/2016 | Karls | A61B 5/24 |
| 9,543,694 | B2 * | 1/2017 | Tagawa | A61B 6/4405 |
| 9,755,356 | B1 * | 9/2017 | Kim | H01R 13/04 |
| 9,907,195 | B2 * | 2/2018 | Montazeri | H01M 10/425 |
| 10,063,009 | B2 * | 8/2018 | Szeto | H01R 13/6205 |
| 10,396,491 | B2 * | 8/2019 | Hsu | H01R 13/6205 |
| 10,512,853 | B2 * | 12/2019 | MacDonald | A63H 33/046 |
| 10,658,789 | B1 * | 5/2020 | Wang | H01R 24/28 |
| 10,998,672 | B2 * | 5/2021 | Weis | H05K 3/365 |
| 11,144,096 | B2 * | 10/2021 | Cho | G06F 1/1652 |
| 11,431,125 | B2 * | 8/2022 | Li | H01R 13/6205 |
| 11,833,443 | B2 * | 12/2023 | Yamaai | A63H 29/22 |
| 11,996,652 | B2 * | 5/2024 | Johnson | H01R 12/737 |
| 12,377,362 | B2 * | 8/2025 | Qu | A63H 33/046 |
| 2011/0263177 | A1 * | 10/2011 | Lemchen | A63H 33/046<br>446/87 |
| 2017/0149171 | A1 * | 5/2017 | Szeto | H04M 1/0274 |
| 2021/0213369 | A1 * | 7/2021 | Yamaai | A63H 29/22 |
| 2021/0220723 | A1 * | 7/2021 | Costello | A63F 3/00 |

* cited by examiner

MAGNETICALLY COUPLED CIRCUITS

This application claims the benefit of U.S. Provisional Application No. 63/415,899 filed on Oct. 13, 2022. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is electrical connectors, using magnets to urge mating connectors together.

BACKGROUND

The background description includes information that may be useful in understanding the present invention. It is not an admission that any of the information provided herein is prior art or relevant to the presently claimed invention, or that any publication specifically or implicitly referenced is prior art.

The interconnection of signals between electronic modules and subsystems is a common engineering design feature. In particular, the ability to establish rapid and reliable short-term edge connections between circuits is often desirable.

Many different connector systems have been developed with specific benefits and detriments. Wall power plug and socket connectors are simple and reliable for delivering power through a limited number of signals. Connectors with high signal density require more precision, typically making them more expensive and fragile and less durable.

One solution is to use an intermediate connector, see e.g., U.S. Pat. No. 6,851,831_Karlicek that shows mechanical planar connections with moderate signal density. Such extrinsic connectors complicate system design and introduce additional points of failure. Similarly, U.S. Pat. No. 7,080,927_Feuerborn utilizes intermediate fastening pins to mechanically join modules and convey power using a plug and socket system.

To simplify and reduce failure from repeated coupling and decoupling, magnets can be used to bring together circuit paths. U.S. Pat. No. 7,322,873_Rosen shows construction blocks with coaxial power connectors utilizing magnets to help secure a mechanical connection. This approach has limited signal interconnect density providing only power linkage.

A related example, U.S. Pat. No. 7,344,379B2_Marmaropoulos, shows garment clasps utilizing magnets to attract electrical plug and socket connectors with limited signal density.

Similarly, Apple MagSafe connectors utilize complex and expensive spring pogo-pins and contact plates for electrical signals with a magnet urging the mating between the connectors.

In GB2442251A_Dunn, methods utilizing magnets for electronic circuit construction kits are described which are not suitable for planar edge connections, and therefore have low signal density.

U.S. Pat. No. 8,058,957B2_Trion, Raytheon describes antenna connectors utilizing a complex detachable out-of-plane interposer substrate with magnets to provide electrical connections between two other substrates.

U.S. Pat. No. 8,187,006_Rudisill and U.S. Pat. No. 8,491,312_Rudisill show electrical edge connections between modules requiring shape-changing complaint conductive pads which are urged together by magnets, which are behind the pads and are not part of the circuit connection. This approach is unnecessarily complicated and costly.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for simple, economical, circuit edge connectors, which can be rapidly and repeatedly coupled and decoupled, without relying on male-female couplings.

SUMMARY OF THE INVENTION

The inventive subject matter provides apparatus, systems and methods in which rapid edge-coupling and decoupling of circuits is effected by current carrying magnets.

The magnets are preferably neodymium iron boron for magnetic strength, although other suitable magnetic compositions are contemplated. As used herein, the term "magnet" includes both one or more magnetic materials, and any electrically conductive protective or other coating about the magnetic material(s).

In preferred embodiments at least one of the magnets is slidable in at least a first degree of freedom. Movement of the magnet is constrained by a mechanical guide, which can optionally have curved sides.

Electrical current can be carried to/from the magnet through an electrical path on or in a substrate, and in some embodiments through sides of the mechanical guide. In various embodiments, the electrical path might or might not extend to the edge of the substrate.

Various objects, features, aspects and advantages of the inventive subject matter will become more apparent from the following detailed description of preferred embodiments, along with the accompanying drawing figures in which like numerals represent like components.

DETAILED DESCRIPTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Figure 1A:
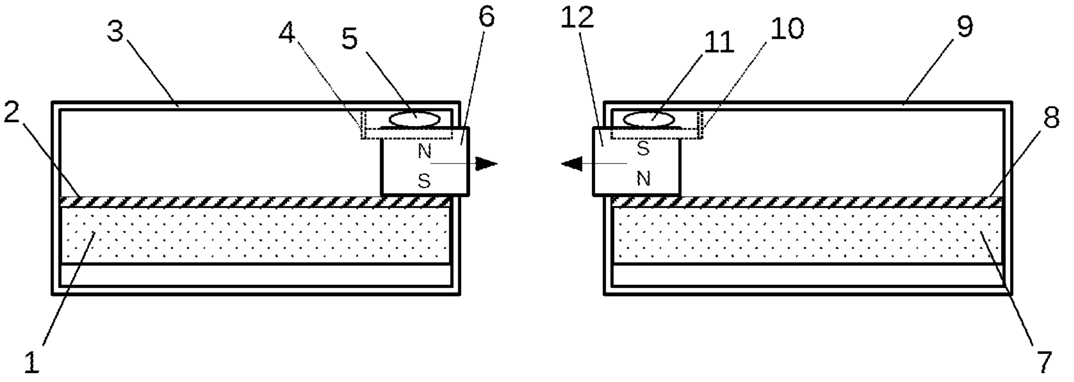
FIG. 1A is a side view of two circuit boards that can be electrically coupled using slidable magnets on the tops of the circuit boards.

In FIG. 1A, an enclosure 3 contains a circuit board 1 with a top conductive layer 2, and a magnet 6 that is slidably mounted atop the circuit board. A mechanical guide 4 constrains movement of the magnet within the enclosure permitting the magnet to partially protrude through an aperture in the enclosure. A compression spring 5 within the mechanical guide imparts force through the magnet to establish an electrical connection between the magnet and the top conductive layer of the circuit board.

Similarly, an enclosure 9 contains a circuit board 7 with a top conductive layer 8, and a magnet 12 that is slidably mounted atop the circuit board. A mechanical guide 10 constrains movement of the magnet within the enclosure permitting the magnet to partially protrude through an aperture in the enclosure. A compression spring 11 within the mechanical guide imparts force through the magnet to establish an electrical connection between the magnet and the top conductive layer of the circuit board.

The poles of magnets 6 and 12 are inversely oriented to mutually attract. When the magnet bearing edges of circuit boards 1 and 7 are brought together in close proximity, the magnets between the boards mutually attract and connect to establish a circuit path between conductive layers 2 and 8. As magnets 6 and 12 are slidable, they are able to displace slightly when establishing a connection between circuits, adapting to mechanical tolerance variations.

Figure 1B:
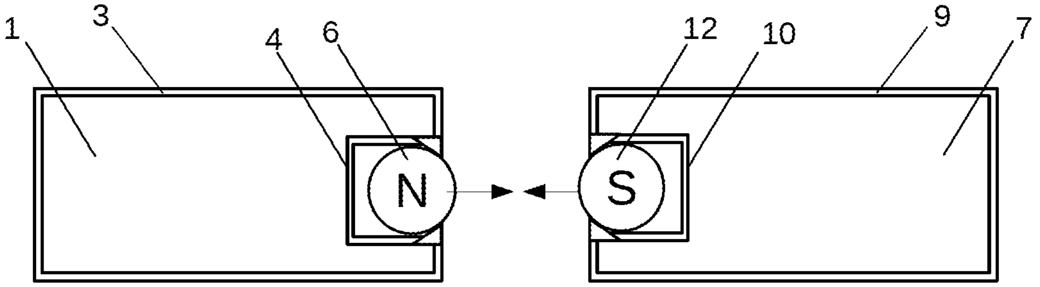
FIG. 1B is a top view of two circuit boards that can be electrically coupled using slidable magnets on the tops of the circuit boards.

FIG. 1B shows the top interior view of the enclosures including the magnets and the mechanical guides which limit movement of the magnets while allowing the magnets to partially protrude from with the enclosure.

Figure 2A:
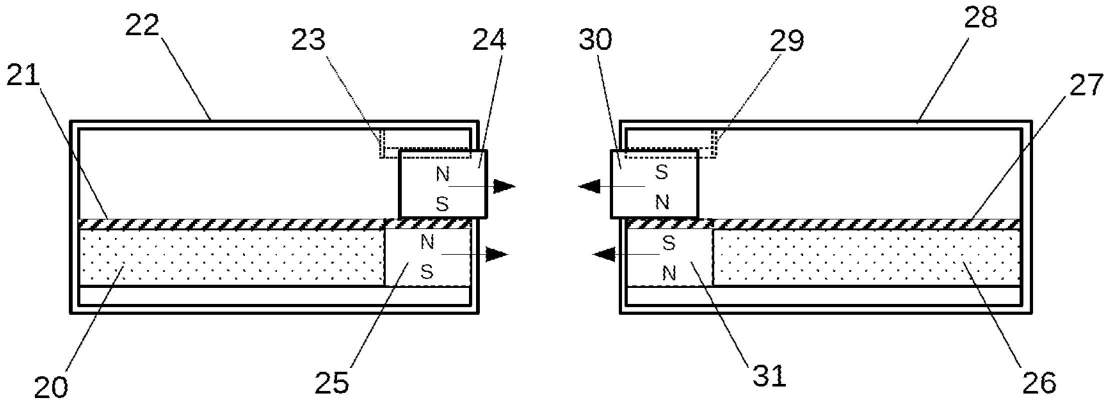
FIG. 2A is a side view of two circuit boards that can be electrically coupled using slidable magnets on the tops of the circuit boards with magnets mounted within holes in the circuit boards.

In FIG. 2A, an enclosure 22 contains a circuit board 20 with a top conductive layer 21. A magnet 25 is mounted within a hole in the circuit board making an electrical connection to layer 21, and a magnet 24 is slidably mounted atop magnet 25 forming an electrical connection to layer 21.

Similarly, an enclosure 28 contains a circuit board 26 with a top conductive layer 27. A magnet 31 is mounted within a hole in the circuit board making an electrical connection to layer 27, and a magnet 30 is slidably mounted atop magnet 31 forming an electrical connection to layer 27.

Mechanical guides 23 and 29 respectively limit movement of the slidable magnets 24 and 30 while allowing the magnets to partially protrude from within their enclosures.

The poles of magnets 24 and 25 are oriented to mutually attract forming an electrical connection between the magnets and conductive layer 27. The poles of magnets 30 and 31 are also oriented to mutually attract, but in inverse orientation relative to magnets 24 and 25. When the magnet bearing edges of circuit boards 21 and 27 are brought together in close proximity, the magnet pairs between boards mutually attract and connect to establish a circuit path between conductive layers 21 and 27. As magnets 24 and 30 are slidable, they are able to displace slightly when establishing a connection between circuits, adapting to mechanical tolerance variations.

Magnets 25 and 31 may alternately be replaced with an electrically conductive ferromagnetic material for design flexibility and/or cost reduction as the top side magnets will still attract and form circuit connections to the circuit boards' top conductive layers. Another alternative is to dispense with magnets 25 and 31 and place a ferromagnetic plate beneath the circuit boards as the top side magnets will attract to the plate through the circuit boards to form electrical connections to the circuit boards' top conductive layers.

Figure 2B:
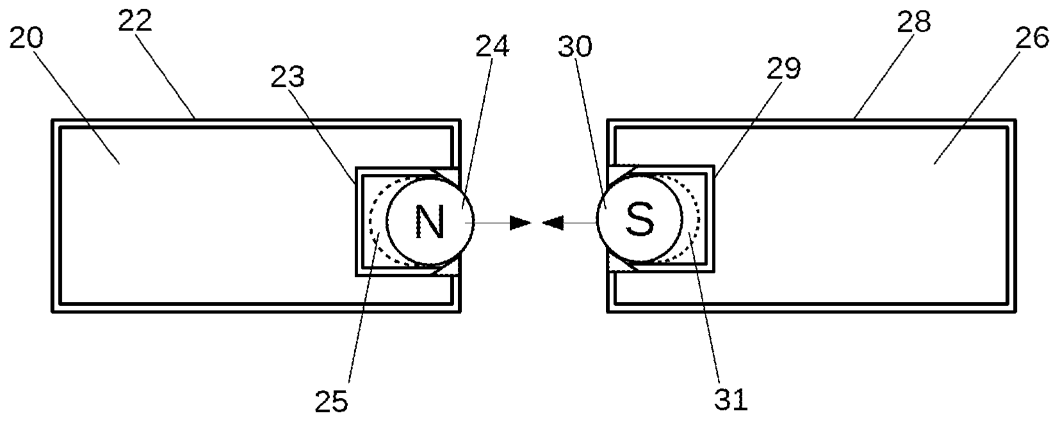
FIG. 2B is a top view of two circuit boards that can be electrically coupled using slidable magnets on the tops of the circuit boards with magnets mounted within holes in the circuit boards.

FIG. 2B shows the top interior view of the enclosures including the mutual attraction and displacement of magnets 24 and 30 above magnets 25 and 31 as the edges of circuit boards 20 and 26 are brought in close proximity. Mechanical guides 23 and 29 limit the movement of the magnets while allowing the magnets to partially protrude from within their enclosures.

Figure 3A:
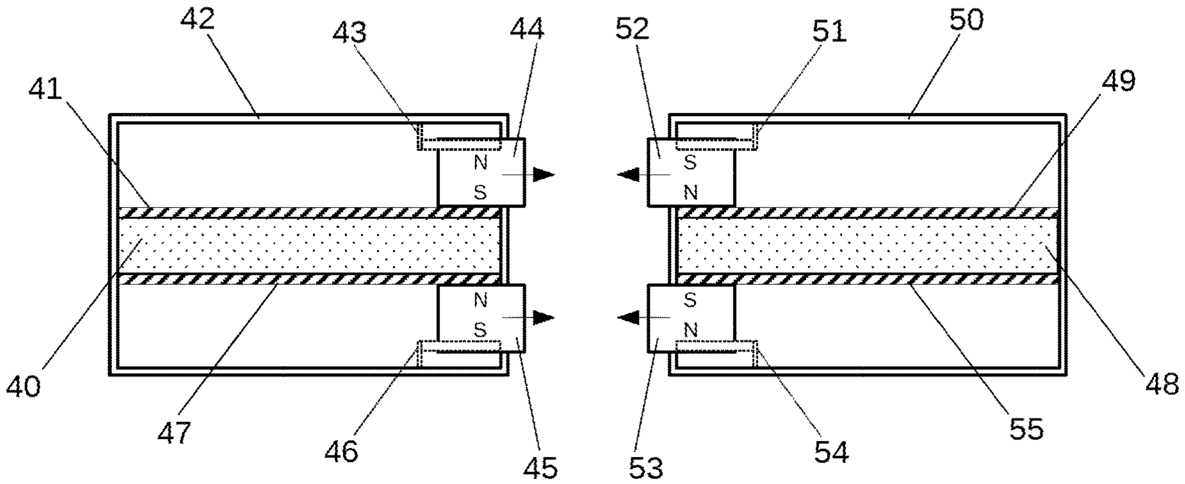
FIG. 3A is a side view of two circuit boards that can be electrically coupled using slidable magnets on tops and bottoms of the circuit boards.

In FIG. 3A, an enclosure 42 contains a circuit board 40 with a top conductive layer 41, a bottom conductive layer 47, a magnet 44 that is slidably mounted on top of layer 41 forming an electrical connection to layer 41, and a magnet 45 that is slidably mounted below layer 47 forming an electrical connection to layer 47.

Mechanical guides 43 and 46 respectively limit movement of the slidable magnets 44 and 45 while allowing the magnets to partially protrude from within the enclosure.

Similarly, an enclosure 50 contains a circuit board 48 with a top conductive layer 49, a bottom conductive layer 55, a magnet 52 that is slidably mounted on top of layer 49 forming an electrical connection to layer 41, and a magnet 53 that is slidably mounted below layer 55 forming an electrical connection to layer 55.

Mechanical guides 51 and 54 respectively limit movement of the slidable magnets 51 and 53 while allowing the magnets to partially protrude from within the enclosure.

The poles of magnets 44 and 45 are oriented to mutually attract through circuit board 40 establishing reliable, movable circuit connections to the top and bottom conductive circuit board layers. The poles of magnets 52 and 53 are oriented to mutually attract, but in inverse orientation relative to magnets 44 and 45. When the magnet bearing edges of circuit boards 40 and 48 are brought together in close proximity, the magnet pairs between boards mutually attract and connect to establish two circuit paths between conductive layers 41 and 49, and layers 47 and 55 respectively.

As magnets 22, 24, 27, and 29 are slidable, they are able to displace slightly when establishing a connection between circuits, adapting to mechanical tolerance variations. Further, as the magnets require no fixed connections to the circuit boards, which is typically achieved with solder or conductive adhesive, assembly is greatly simplified.

Figure 3B:
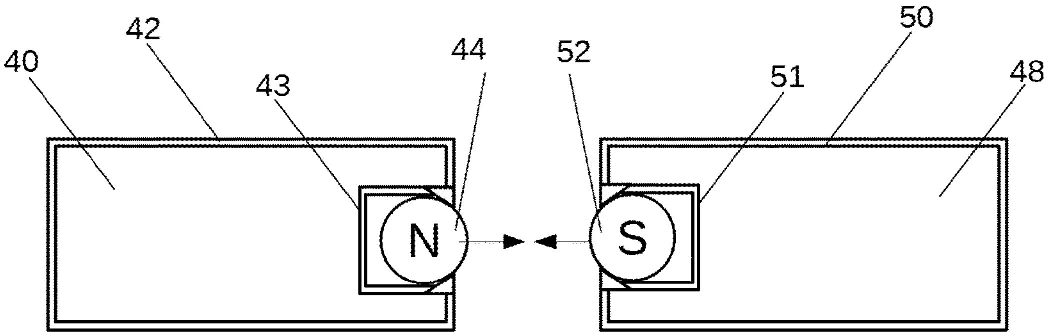
FIG. 3B is a top view of two circuit boards that can be electrically coupled using slidable magnets on tops and bottoms of the circuit boards.

FIG. 3B shows the top interior view of the enclosures including the mutual attraction of magnets 44 and 52 as the edges of circuit boards 40 and 48 are brought in close proximity. Mechanical guides 43 and 51 limit the movement of the magnets while allowing the magnets to partially protrude from within their enclosures.

Figure 4A:
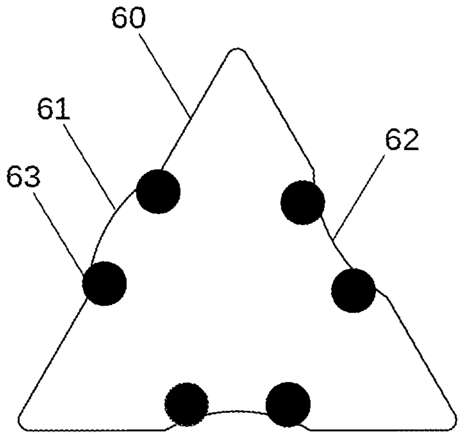
FIG. 4A is a top view of a module with mechanically keyed convex and concave magnetic connection edges.
Figure 4B:
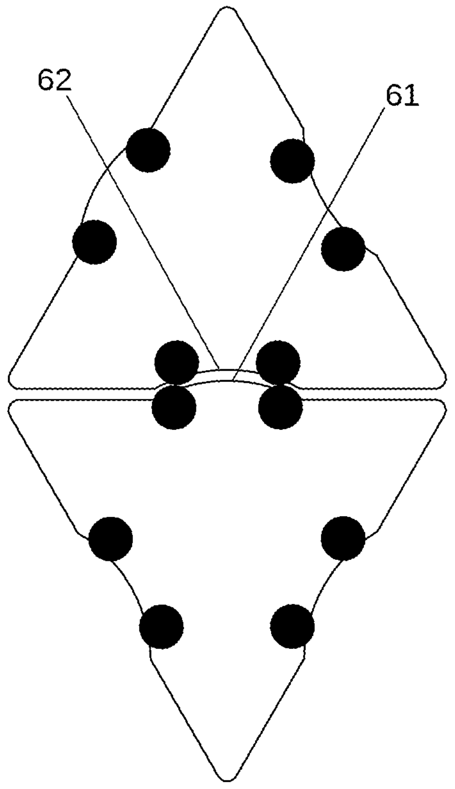
FIG. 4B is a top view of two modules with mechanically keyed convex and concave magnetic connection edges showing a coupling between two edges.

FIG. 4A shows a module 60 with keyed magnetic connecting edges. A convex edge 61 has a contour that is capable of mating with a concave edge 62. All edges contain magnets 63. FIG. 4B shows two mated modules magnetically connected via convex edge 61 and concave edge 62.

In the described examples, the shapes of the magnets may be selected to suit different interconnection schemes. For example cylindrical magnets aid planar circuit interconnection systems, while spherical or polyhedral shaped magnets enable both planar and out-of-plane circuit interconnection systems.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system comprising:
- a first substrate having a first edge, and a first electrically conductive path;
- a first magnet slidably disposed on the first electrically conductive path and configured to slide along the first electrically conductive path toward or away from the first edge, wherein the first magnet is electrically coupled with the first electrically conductive path;
- a second substrate having a second edge, and a second electrically conductive path;
- a second magnet slidably disposed on the second electrically conductive path and configured to slide along the second electrically conductive path toward or away from the second edge, wherein the second magnet is electrically coupled with the second electrically conductive path; and
- the first and second magnets oriented such that when juxtaposed, they couple together magnetically and electrically to form a third electrically conductive path between the first and second electrically conductive paths.

2. The system of claim 1, further comprising a first mechanical guide configured to constrain sliding of the first magnet in at least first and second degrees of freedom.

3. The system of claim 2, wherein the first mechanical guide comprises a recess on the first edge.

4. The system of claim 3, wherein the first electrically conductive path extends along the first substrate toward the recess.

5. The system of claim 3, wherein the recess is curved.

6. The system of claim 1, wherein the first magnet is slidably disposed upon an upper surface of the first substrate, and the upper surface of the first substrate is recessed with respect to a top surface of the first substrate.

7. The system of claim 1, wherein the first magnet is slidably disposed upon a lower surface of the first substrate, and the lower surface of the first substrate is recessed with respect to a bottom surface of the first substrate.

8. The system of claim 1, wherein the first electrically conductive path extends to the edge of the first substrate.

9. The system of claim 1, wherein the first electrically conductive path does not extend to the first edge.

10. The system of claim 1, further comprising a magnet/ferromagnetic material within or on the first substrate.

* * * * *